E. T. MURPHY.
HUMIDITY CONTROLLING APPARATUS.
APPLICATION FILED MAY 17, 1909.
1,012,414.
Patented Dec. 19, 1911.
3 SHEETS—SHEET 1.
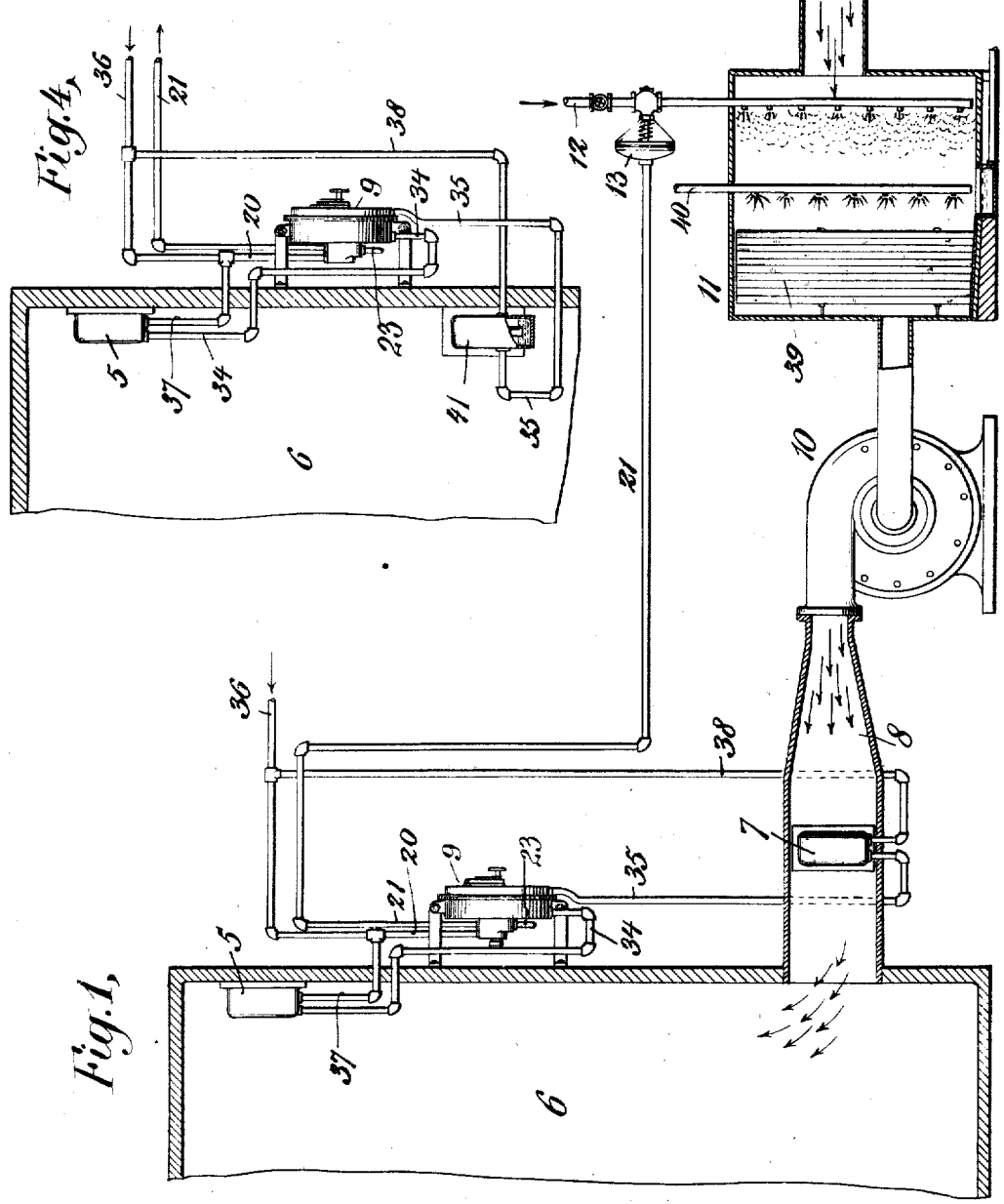

E. T. MURPHY.
HUMIDITY CONTROLLING APPARATUS.
APPLICATION FILED MAY 17, 1909.
1,012,414.
Patented Dec. 19, 1911.
3 SHEETS—SHEET 2.
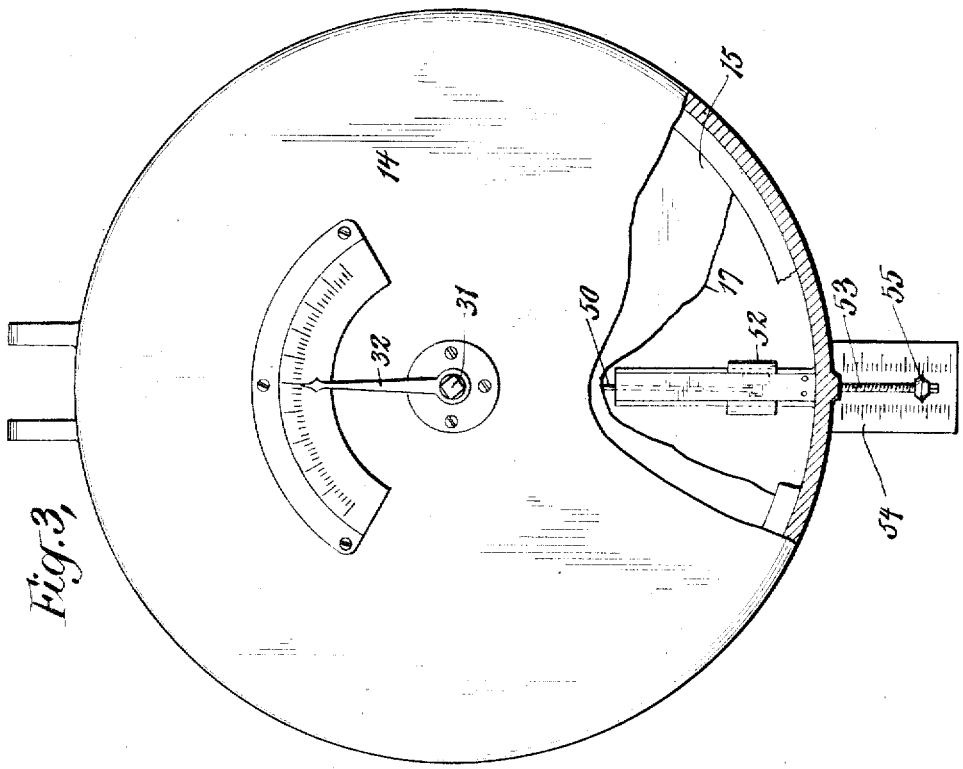
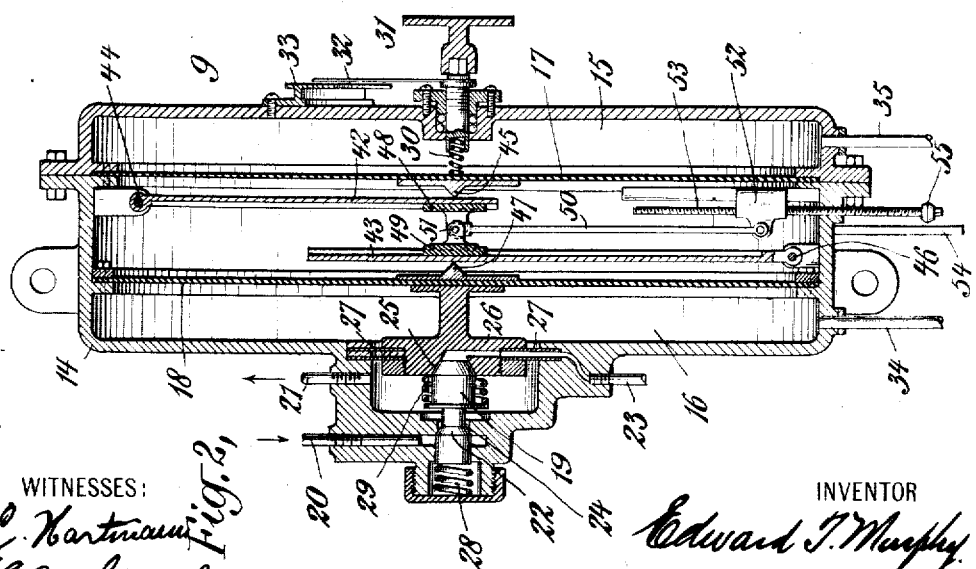
WITNESSES:
INVENTOR
Edward T. Murphy
BY
his ATTORNEYS

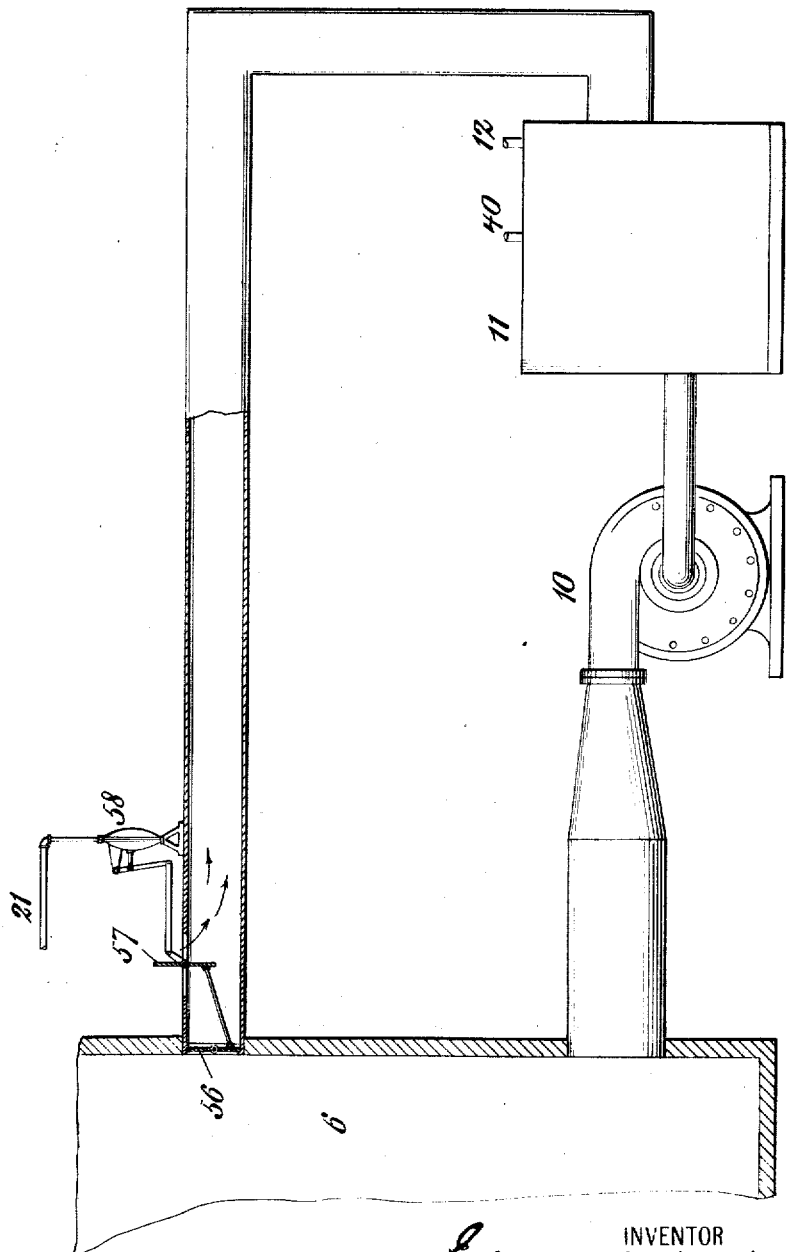

UNITED STATES PATENT OFFICE.

EDWARD T. MURPHY, OF PHILADELPHIA, PENNSYLVANIA.

HUMIDITY-CONTROLLING APPARATUS.

1,012,414. Specification of Letters Patent. Patented Dec. 19, 1911.

Application filed May 17, 1909. Serial No. 496,417.

*To all whom it may concern:*

Be it known that I, EDWARD T. MURPHY, a citizen of the United States of America, and a resident of Philadelphia, county of Philadelphia, and State of Pennsylvania, have invented certain new and useful Improvements in Humidity-Controlling Apparatus, of which the following is a specification, reference being had to the accompanying drawings, forming a part thereof.

My invention relates to improvements in humidity controlling apparatus of the type in which a controller is operated by the differential action of two thermostats or thermostatic elements, and my invention consists in utilizing the differential action of two thermostats or thermostatic elements to vary the fluid pressure upon opposite sides of a fluid pressure device, the operation of the fluid pressure device causing in turn the operation of the controller.

In carrying out my invention I preferably employ two separate thermostats, one arranged in the chamber wherein the humidity is to be regulated, and the other arranged in the path of incoming saturated air. As a substitute for the latter I may employ a second thermostat directly exposed to the air within the chamber wherein the humidity is to be regulated, but in such case one of the thermostats would have to be of the dry bulb variety, and the other of the wet bulb variety.

The fluid pressure device may conveniently comprise two chambers separated by a movable wall, fluid pressure being admitted to the chambers upon opposite sides of the movable wall by the action of the two thermostats, the said wall in its movement being arranged to control the flow of motive fluid to and from a fluid pressure motor for the controller. The controller may be in the form of a valve for controlling the admission of steam to the air for raising its temperature before admitting it to the chamber, or other forms of controllers may be employed, such as dampers, as will presently be explained.

In order that my invention may be fully understood, I will now proceed to describe an apparatus embodying my invention, and will then point out the novel features in claims.

In the drawings: Figure 1 is a diagrammatic view in sectional elevation of a humidity controlling apparatus constituting an embodiment of my invention. Fig. 2 is a view in vertical transverse section through a form of fluid pressure device which may be employed. Fig. 3 is a face view of the same, with a part of the casing broken away. Fig. 4 is a diagrammatic view of a modified form of the apparatus in which both the thermostats are located in the chamber wherein the humidity is to be regulated. Fig. 5 is a further modification showing the controller in the form of fluid pressure motor operated dampers, in lieu of the fluid pressure motor operated steam valve shown in the other figures.

Referring first to the form of apparatus shown in Fig. 1, such an apparatus comprises in general a thermostat 5 disposed within a chamber 6, the humidity of which is to be regulated; a second thermostat 7 located in the inlet pipe 8 for the incoming currents of air; a fluid pressure device 9; a blower 10 for introducing the currents of air; a humidifying apparatus 11; a water supply 40 thereto; a pipe 12 for admitting steam to the humidifying apparatus; and a fluid pressure operated controlling valve 13 located in the said pipe 12. The fluid pressure device 9, in the form shown in Figs. 2 and 3, comprises a casing 14 inclosing two chambers 15 and 16 separated by a movable wall, by means of which valve mechanism may be operated. The movable wall in the example of the fluid pressure device illustrated in detail in Figs. 2 and 3 comprises two diaphragms 17 and 18, the said diaphragms being, however, connected together in abutting relation by means of certain intermediate links, levers, etc., for a purpose presently to be explained. It is sufficient for the present to remark that movements of one diaphragm are imparted to the other through the said links, levers, etc., and that with the parts adjusted as they are shown in Fig. 2 the movements of the two diaphragms will be synchronous and uniform in every respect so that so far as the effect of their operation is concerned a single diaphragm might be employed instead of the two diaphragms shown. The valve mechanism which is operated by the movements of the said movable wall may be of any desired form and as a convenient form thereof I have shown an inlet valve 22 for controlling passage of fluid from an inlet pipe 20 to a distributing pipe 21, and an exhaust valve 19 for controlling communication between the distributing pipe 21 and an exhaust or discharge pipe 23. The seat 24 for the valve 22 is located in a portion of the casing 14, while the seat 25 for the exhaust valve 19 is located in a head 26 which is connected with the diaphragm 18. Diaphragms 27 between the head 26 and the casing 14 prevent the escape of fluid under pressure, from the chamber 16 into the distributing pipe 21. The inlet valve 22 is pressed toward its seat by means of a spring 28, while a light spring 29 tends to move the exhaust valve 19 away from its seat 25. The stem of the valve 22 engages the rear of the valve 19 so that the spring 28, in closing the valve 22, tends to force the valve 19 to its seat and to oppose movement of the diaphragm 17 in one direction; movement of the diaphragm in the other direction is opposed by means of a spring 30, the tension of the said spring 30 being adjustable by means of an adjusting screw 31. An indicator hand 32 is secured to the adjusting screw 31 which, in its registration with a dial 33, will indicate the adjustment imparted to the spring 30. The chambers 15 and 16 are connected with the thermostats 7 and 5 respectively by means of pipes 35 and 34, while the distributing pipe 21 connects with the operating chamber of the fluid pressure operated valve 13. Motive fluid is supplied to the thermostats 5 and 7 by means of a supply pipe 36, the said supply pipe having a branch 37 which leads to the thermostat 5, and another branch 38 which leads to the thermostat 7, a third branch being the pipe 20 aforesaid. The thermostats 5 and 7 may be of any desired form, such as may be readily procured upon the market to-day, the said thermostats being designed to admit a quantity of motive fluid from the respective branches 37 and 38 to the respective pipes 34 and 35 leading to the chambers 16 and 15 proportionate to the temperatures to which they are subjected, that is to say, a proportionately increasing amount as the temperatures rise.

The action of the apparatus so far described is as follows: Selecting 70% as the degree of relative humidity which it is desired to maintain in the chamber 6, and assuming that dry saturated air (that is to say, air at 100% humidity but carrying no free water) is being admitted along the pipe 8,—and reference to the psychrometric tables showing that the difference between the dry bulb temperature of air at 70% relative humidity and the temperature of fully saturated air (100% relative humidity) having the same absolute humidity, that is to say, containing the same weight of water vapor per cubic foot, is approximately 11° Fahrenheit, the latter being the lower the adjusting screw 31 will be so adjusted as to compensate for such 11° difference in temperature, that is to say, it will be so adjusted that the movable wall of the fluid pressure device will be substantially in balance when the thermostat 5 is subjected to a temperature 11° higher than the temperature to which the thermostat 7 is subjected. When the difference between these two temperatures is less than 11° the pressure in the chamber 15 will predominate, the valve 19 will be closed, the valve 22 will be opened, and motive fluid will be admitted from the pipe 20 to the pipe 21 to the fluid pressure motor of the steam valve 13, to close the steam valve whereby to reduce the temperature of the incoming air, while if the difference in temperature becomes greater than 11° the fluid pressure will predominate in the chamber 16, the inlet valve 22 will be closed, the exhaust valve 19 opened, and motive fluid will be discharged from the fluid pressure motor of the steam valve 13 to thereby permit the valve to open under spring pressure, whereby to admit steam for the purpose of raising the temperature of the incoming air.

Bearing in mind that because the incoming air through the pipe 8 is fully saturated, the amount of moisture delivered to the chamber 6 will be entirely dependent upon the heat at which the air is delivered (see psychrometric tables), and that in accordance with the foregoing the apparatus will be so controlled as to admit a greater quantity of moisture as the difference in temperature surrounding the thermostats 5 and 7 is greater than 11°, and a proportionately less quantity of moisture as the temperature difference around the said thermostats is less than 11°, it will follow that the amount of moisture in the chamber 6 will be thereby uniformly maintained at the desired relative degree of humidity. If the temperature in the chamber should rise from any cause it would, of course, become necessary to admit a greater quantity of moisture because, while the absolute humidity in the room (i. e., the number of grains of water per cubic foot,) remains the same for different temperatures, the relative humidity varies, so that should the temperature of the room rise the tendency of the relative humidity would be to fall, but as thereby the rise of temperature in the chamber 6 would increase the difference in the temperatures surrounding the thermostats 5 and 7, the controller 13 would be opened to admit more steam so as to raise the temperature of the incoming air, whereby to admit a larger quantity of moisture.

To maintain the incoming air in a dry though saturated condition, I may employ the usual eliminator plates 39 by means of which free water is entrapped and prevented from entering the chamber with the currents of air through the pipe 8. By this means the amount of moisture admitted is made absolutely dependent upon the temperature of the admitted air, as is desirable.

So far I have described this apparatus as employing a thermostat in the path of the incoming currents of saturated air whereby the thermostat is operated by air at 100% humidity, i. e., at the "dew point" as it is commonly called, but it will be readily seen that I may, if preferred, move this thermostat into the chamber 6, and I have shown the thermostat as so located in Fig. 4 and have designated the thermostat in this figure by the reference character 41. In such case the thermostat 41 must be of the wet bulb variety, (that is to say, the thermostatic element thereof must be kept wet, just as is the wet bulb of a psychrometer,) as distinguished from the thermostat 5 which will be of the dry bulb variety, (the thermostatic element or elements thereof being in a dry condition). In this arrangement the two thermostats will operate differentially by reason of the difference between the wet and dry bulb temperatures in the chamber 6, the wet and dry bulb temperatures differing under the laws shown by the psychrometric tables and as may be determined by the readings of an ordinary wet and dry bulb psychrometer. It will, of course, in such event, be necessary to make a further adjustment for the various relative humidities desired, because while the difference between the "dry bulb" and "dew point" temperatures is substantially constant throughout the various ranges of temperature for any predetermined percentage of humidity, the difference between wet and dry bulb readings at different temperatures varies, and it is for this purpose that I have provided the various links, levers, etc., in the fluid pressure device between the diaphragm elements 17 and 18 of the movable wall. These elements comprise levers 42 and 43, the said lever 42 being pivoted at 44 to the casing of the instrument and having its rear face, near the outer end thereof, in engagement with the knife edge of a projection 45 carried by the diaphragm 17, while the lever 43 is pivoted at 46 to the instrument upon the other side thereof, the free end of the said lever being in engagement with the knife edge of a projection 47 carried by the diaphragm 18. Slides 48 and 49 are carried by the said levers 42 and 43, being pivotally connected together and also to a link 50 by means of a pivot pin 51, the said link being connected at its other end to an adjustable slide 52. The said slide 52 is threaded upon an adjusting stud 53, the said adjusting stud having conveniently right and left handed threads, one of which coacts with the said slide, and the other of which is fitted to a portion of the casing. A dial 54 and an indicator 55 may be employed to indicate the position of the parts. The instrument, as shown in Fig. 2, is adjusted with the slides 48 and 49 in line with the projections 45 and 47 whereby movements imparted to one or other of the diaphragms will be transmitted uniformly and synchronously to the other diaphragm, as is stated above, but by manipulating the adjusting stud 53 the slides may be moved upward so that a movement imparted to the diaphragm 17 will result in a proportionately less movement to the diaphragm 18, and the pressure in the chamber 15 will be proportionately more effective than will the pressure in the chamber 16. This will effect the desired compensation in a simple and effective manner, and where this instrument is employed with wet and dry bulb thermostats, as in the example of my invention shown in Fig. 4, the stud 53 must be manipulated to produce the desired adjustment in accordance with the relative humidity required to be maintained in the chamber 6.

It will, of course, be understood that I may vary the amount of moisture admitted in other ways besides opening and closing steam valves, and in Fig. 5 I have shown a modified form of apparatus in which dampers 56 and 57 are operated by a fluid pressure motor 58 which is connected with the pipe 21. In this instance the damper 57 controls the supply of fresh air to the humidifying apparatus, while the damper 56 controls the supply of return air from the chamber 6. Such a control may be used either with or without the control shown in the other figures, as will be well understood.

The term "controller" and "controlling valve" as employed in the specification is of course used in a broad sense, and is intended to include dampers and the like, dampers in any event being merely one form of valve.

What I claim is:

1. Humidity controlling apparatus comprising a differentially operated fluid pressure device including a movable wall, differentially operated thermostatic mechanism for controlling the fluid pressure upon the opposite sides of the said movable wall, and a controller governed in its operation by movements of the said movable wall.

2. Humidity controlling apparatus comprising a differentially operated fluid pressure device including a movable wall, differentially operated thermostatic mechanism for controlling the fluid pressure upon the opposite sides of the said movable wall, and a fluid pressure operated motor governed in its operation by movements of the said movable wall.

3. Humidity controlling apparatus comprising a fluid pressure device including a movable wall, differentially operated thermostatic mechanism for controlling the fluid pressure upon opposite sides of the said movable wall, a controller, and a fluid pressure operated motor governed in its operation by movements of the said movable wall.

4. Humidity controlling apparatus comprising a fluid pressure device including a movable wall, differentially operated thermostatic mechanism for controlling the fluid pressure upon the opposite sides of the said movable wall, and a controller governed in its operation by the movements of the said movable wall.

5. Humidity controlling apparatus comprising a fluid pressure device including a movable wall, differentially operated thermostatic mechanism for controlling the fluid pressure upon the said movable wall, a controller, and a fluid pressure operated motor therefor, the said fluid pressure operated motor being governed in its operation by movements of the said movable wall.

6. Humidity controlling apparatus comprising a fluid pressure device including a movable wall and valve mechanism operated thereby, differentially operated thermostatic mechanism for controlling the fluid pressure upon the said movable wall, and a fluid-pressure-operated-controlling valve governed in its operation by the said valve mechanism of the fluid pressure device.

7. Humidity controlling apparatus comprising two separate and independent thermostats, a fluid pressure device having a movable wall, one side of which is exposed to fluid pressure controlled by one of the thermostats and the other side of which is exposed to fluid pressure controlled by the other said thermostat, and valve mechanism controlled in its operation by the movements of the said movable wall.

8. Humidity controlling apparatus comprising two separate and independent thermostats, a fluid pressure supply for each of the thermostats, independent pressure lines controlled thereby, and valve mechanism controlled by the relative pressure in the said pressure lines.

9. Humidity controlling apparatus comprising a differentially operated fluid pressure device, adjusting means for increasing the mechanical pressure upon one side thereof, differentially operated thermostic mechanism for controlling the differential fluid pressures upon the fluid pressure device, and a controller governed in its operation by the operation of the differential pressure device.

10. Humidity controlling apparatus comprising a differentially operated fluid pressure device including a movable wall, adjusting means for applying a predetermined pressure against one side of the said wall, differentially operated thermostatic mechanism for controlling the fluid pressure upon both sides of the said movable wall, and a controller governed in its operation by movements of the said movable wall.

11. Humidity controlling apparatus comprising a differentially operated fluid pressure device including a movable wall, a spring bearing against one side of the said movable wall, and means for adjusting the tension of the said spring, differentially operated thermostatic mechanism for controlling the fluid pressure upon both sides of the said movable wall, and a controller governed in its operation by movements of the said movable wall.

12. Humidity controlling apparatus comprising a differentially operated fluid pressure device including two diaphragms which together constitute a movable wall, intermediate mechanism connecting the said diaphragms together, and means for adjusting the same to cause the movement of one of the diaphragms to vary in extent with respect to the movement of the other said diaphragm, differentially operated thermostatic mechanism for controlling the differential fluid pressure upon either side of the said movable wall in the fluid pressure device, and a controller governed in its operation by the movement of the said movable wall.

13. Humidity controlling apparatus comprising a differentially operated fluid pressure device including two diaphragms constituting a movable wall, intermediate mechanism between the two said walls connecting them together, said means including a lever, means for varying the leverage exerted thereby whereby to vary the proportion of movement between the two said diaphragms, differentially operated thermostatic mechanism for controlling the fluid pressure upon opposite sides of the said movable wall, and a controller governed in its operation by movements of the said movable wall.

14. Humidity controlling apparatus comprising two separate and independent thermostats, independent fluid pressure lines controlled thereby, and a humidity controlling device controlled by the relative pressure in said pressure lines, substantially as set forth.

15. Humidity controlling apparatus comprising two separate and independent thermostats, independent fluid pressure lines controlled thereby, and a humidity controlling device upon which the fluid pressures in said independent pressure lines act differentially, substantially as set forth.

16. The combination of means for regulating humidity, a controlling device therefor, means whereby said controlling device is acted upon differentially by independent fluid pressures, and separate thermostats which independently control said fluid pressures, substantially as set forth.

17. The combination of a fluid-pressure-operated humidity controlling device upon which independent fluid pressures act differentially, and separate thermostats which are influenced by different temperatures and independently control said fluid pressures, substantially as set forth.

18. In an apparatus for controlling the humidity in an inclosure, the combination of a fluid-pressure-operated device upon which independent fluid pressures act differentially for controlling the humidity of air supplied to an inclosure, a thermostat influenced by the temperature in said inclosure and controlling one of said fluid pressures, and an independent thermostat influenced by the temperature of the humidified air supplied to the inclosure and controlling the other of said fluid pressures, substantially as set forth.

EDWARD T. MURPHY.

Witnesses:
D. HOWARD HAYWOOD,
LYMAN S. ANDREWS, Jr.